United States Patent [19]

Saunders et al.

[11] Patent Number: 4,619,792

[45] Date of Patent: Oct. 28, 1986

[54] PROCESS FOR MAKING AN OPTICALLY TRANSMISSIVE BODY

[75] Inventors: Kenneth J. Saunders, Waltham; Randal W. Tustison, Lexington, both of Mass.

[73] Assignee: Raytheon Company, Lexington, Mass.

[21] Appl. No.: 500,702

[22] Filed: Jun. 3, 1983

[51] Int. Cl.[4] .............................................. B29D 11/00
[52] U.S. Cl. ..................................... 264/1.2; 350/1.1; 423/263; 423/430; 423/511
[58] Field of Search ........... 423/263, 511, 430, 419 R; 264/1.2; 350/1.1

[56]       References Cited
       U.S. PATENT DOCUMENTS

| 1,641,563 | 9/1927 | Wood | 423/430 |
| 3,401,008 | 9/1968 | Head | 423/263 |
| 3,446,574 | 5/1969 | Head | 423/263 |
| 3,681,011 | 8/1972 | Gazza et al. | 423/263 |
| 4,461,750 | 7/1984 | Chess et al. | 423/263 |

FOREIGN PATENT DOCUMENTS

| 2139620 | 12/1973 | France | 423/263 |
| 95900 | 8/1978 | Japan | 423/419 R |
| 295407 | 10/1977 | U.S.S.R. | 423/263 |

OTHER PUBLICATIONS

Daniel L. Chess et al., J. Am. Ceramic Soc., 66, (#1), 18–22, (Jan. 1983).
"Ternary Sulfide Infrared Window Materials", First Annual Report to Office of Naval Research, 5/1/83 to 10/31/81.
"Fabrication Studies of Ternary Rare Earth Sulfides for Infrared Applications", Final Technical Report to Office of Naval Research, 6/1/80 to 5/1/81.
"Transactions of Government Industry Workshop on Advanced Optical Ceramics", Solomon Musikant, 3/26/82.

Primary Examiner—G. L. Kaplan
Attorney, Agent, or Firm—Denis G. Maloney; Richard M. Sharkansky

[57] ABSTRACT

An optically transmittant body of a ternary sulfide material such as calcium lanthanum sulfide is provided by concurrently precipitating from a nitrate solution of calcium and lanthanum, calcium carbonate and lanthanum carbonate. The precipitation reaction forms a homogeneous fine particle size starting powder of calcium carbonate and lanthanum carbonate powders. The starting powder is reacted with a sulfurizing agent such as hydrogen sulfide to convert such starting powder into a calcium lanthanum sulfide powder. The particle size of the homogeneous starting powder is sufficiently small to permit substantially complete and uniform conversion of such starting powder into the calcium lanthanum sulfide powder. The calcium lanthanum sulfide powder is then compacted into the desired form of the optically transmittant body and is subsequently sintered at an elevated temperature in an atmosphere of excess sulfur to increase the density of the material. An excess sulfur atmosphere is provided to prevent decomposition of the calcium lanthanum sulfide and to aid in the conversion of any residual calcium carbonate, lanthanum carbonate material present in the calcium lanthanum sulfide. The sintered calcium lanthanum sulfide material is then compressed at an elevated pressure and temperature providing the material of the optically transmittant body.

8 Claims, 14 Drawing Figures

SOLID STATE REACTION (200X)
$La_2O_3$ ; $CaCO_3$ (PRIOR ART)

*FIG. 2B*

CO-PRECIPITATION OF $CaCO_3$ ; $La_2(CO_3)_3$
(200X)

FIG. 3A

MICROSTRUCTURE AFTER SINTERING

FIG. 3B

MICROSTRUCTURE AFTER HOT ISOSTATIC PRESSING

CALCIUM LANTHANUM SULFIDE
AND LANTHANUM SULFIDE SOLID
SOLUTION POWDERS

*FIG. 8A*

MICROSTRUCTURE AFTER SINTERING

*FIG. 8B*

MICROSTRUCTURE AFTER HOT ISOSTATIC PRESSING

PROCESS FOR MAKING AN OPTICALLY TRANSMISSIVE BODY

The Government has rights in this invention pursuant to Contract No. N00014-80-C-0430 awarded by the Department of the Navy.

BACKGROUND OF THE INVENTION

This invention relates generally to optical materials and more particularly to materials which have improved optical transmittance for far infrared electromagnetic radiation.

As is known in the art, optically transmittant materials are used in fabricating optical windows for use in various optical detection applications. In particular, such materials are used as domes and windows in heat seeking missile applications. When used in such applications, the selected material for a given thickness must be sufficiently transmittant to infrared electromagnetic radiation to enable sensitive detection of such radiation, and must be sufficiently durable to withstand mechanical forces encountered during the missile's flight. Further, the selected material must also be resistant to rain erosion, damage caused by high velocity water droplets impinging on the material during flight.

One material which has been suggested for such application is calcium lanthanum sulfide ($CaLa_2S_4$). Calcium lanthanum sulfide is one of a class of materials known as ternary sulfides. These materials are characterized by having two cations in chemical combination with a sulfide $S^{2-}$ ion as the anion of the compound. One method used in the prior art for fabricating such ternary sulfide material as described in an article, by Pennsylvania State University, entitled "Ternary Sulfide Infrared Window Materials," First Annual Report to the Office of Naval Research, Contract Number N00014-80-C-0526 (May 1, 1980–October 31, 1981), AD-A120 153/2 Index 4 February 1983, includes the step of spray drying calcium and lanthanum ions from a solution of calcium nitrate and lanthanum nitrate in an atmosphere of oxygen to form a starting powder of calcium oxide powder and lanthanum oxide powder. The starting powder is then sulfurized to provide calcium lanthanum sulfide powder. The resulting powder is further processed to form a compact, densified body of calcium lanthanum sulfide material. While the spray drying of calcium and lanthanum ions is an adequate process for producing calcium lanthanum sulfide material, such a process may be costly, and further, the degree of optical transmittance provided by such material is less than the theoretical maximum transmittance. A second method known in the art to produce a calcium lanthanum sulfide compound is a technique commonly referred to as solid state reaction processing. This involves producing a starting powder by mixing powders of calcium carbonate and lanthanum oxide, and sulfurizing the starting powder to produce the calcium lanthanum sulfide material. While this latter method is less costly and simpler compared with the former method; material produced by the latter method has reduced transmittance. More particularly, with the latter method an x-ray diffraction pattern of the produced calcium lanthanum sulfide material indicates the presence of the binary sulfide, calcium sulfide. Since calcium sulfide has a substantially different crystallographic structure than calcium lanthanum sulfide, the presence of calcium sulfide is believed to cause the reduced transmittance of calcium lanthanum sulfide material produced with the latter method. Further, solid state reaction processing of commercially available calcium carbonate and lanthanum oxide powders provides a starting powder having a very large variation in powder particle size. Due to the presence of very large agglomerated particles of lanthanum oxide, the sulfurization process is very slow, necessitating the use of a particle size reduction process such as jet milling prior to sulfurization. Jet milling, or similar techniques of particle size reduction, reduces some of the cost advantages of the latter method over the former method and also introduces impurities into the powder which are believed to degrade optical properties of the resulting calcium lanthanum sulfide.

With calcium lanthanum sulfide powder formed by either of the above methods, the powder is then molded into a compact body and then the body is densified to provide the compact, densified body. Several different densifying steps are generally performed in order to densify the material. In general, however, powders fabricated by either method described above generally require the step of conventional hot pressing in the densification process to provide bodies with high density. Hot pressing involves compression of the compact body in a single or uniaxial direction at an elevated temperature. While hot pressing is a conventional processing technique, its elimination is highly desirable because, in general, hot pressing can be performed only on a single body at a time thus increasing product cost.

SUMMARY OF THE INVENTION

In accordance with the present invention, a method is provided for producing a sulfide powder comprising the steps of: forming a precipitate from a solution and sulfurizing said precipitate to form the sulfide. With such method, a fine-grained, homogenous precipitate is provided. The fine-grain homogenous precipitate permits the processing step of sulfurization of such precipitate to be accomplished over a relatively short period of time, because the fine, or small size, particles of the precipitate increase the surface area of reaction. Further, because the precipitate is homogenous, the conversion of such precipitate into the sulfide is substantially complete and uniform.

In accordance with an additional aspect of the present invention, a method for producing a ternary sulfide includes the steps of concurrently forming a precipitate having a pair of cations of the ternary sulfide and sulfurizing said precipitate to produce the ternary sulfide. In a preferred embodiment, the pair of cations is calcium and lanthanum ions and the precipitate is a homogenous mixture of calcium carbonate and lanthanum carbonate which, after sulfurization, provides a powder of calcium lanthanum sulfide. With such process, a calcium lanthanum sulfide body is fabricated without requiring hot pressing and has an optical transmittance of at least 50% for electromagnetic radiation having a wavelength of 15 microns for thicknesses of less than 0.011 inches and a coefficient of absorption $\alpha$ given by $\alpha = [-\ln(T_2/T_1)]/(t_2 - t_1)$ where $T_1$, $T_2$ are transmittances of samples having a thickness $t_1$, $t_2$, respectively, and $\alpha$ is in the range of 9 cm$^{-1}$ to 11 cm$^{-1}$ for electromagnetic radiation having a wavelength in the range of 4 microns to 16 microns.

In accordance with an additional aspect of the present invention, a method for producing a sulfide body having a density of at least 99.5% of the theoretical density includes the steps of sintering the body in an atmosphere of sulfur and hot isostatically pressing the sintered sulfide body at an elevated temperature in the range of 900° to 1100° C. and at an elevated pressure in the range of 25,000 psi to 29,000 psi. The sintered body (preferably having a density of at least 91%) is placed in a vessel and a fluid, such as an inert gas, is introduced into the vessel to a predetermined pressure. The temperature of the gas in the vessel is then elevated to preferably 990° C. increasing the pressure of the gas in the vessel to the range of 25,000 psi to 29,000 psi. The material remains under this condition of elevated pressure and elevated temperature for a predetermined period of time. With such method, the sulfide body provided has an actual density of at least 99.5% of the theoretical density of such ternary sulfide material without hot pressing.

In accordance with an additional aspect of the present invention, a method of forming a calcium lanthanum sulfide body comprises the steps of: mixing a solution of calcium and lanthanum nitrates with a solution of ammonium carbonate, and concurrently forming a precipitate of calcium carbonate and lanthanum carbonate; reacting the precipitate with sulfur forming a calcium lanthanum sulfide powder; consolidating the calcium lanthanum sulfide powder into a body; sintering the calcium lanthanum sulfide material of the body to provide such sulfide material with a density in the range of 91 to 95% of the theoretical density of such sulfide material compressing the sintered sulfide material at a predetermined pressure and temperature to provide the sintered sulfide material with an actual density of at least 99.5% of theoretical density; and grinding and polishing the compressed sulfide material to a predetermined thickness. With such method, the step of concurrently forming a precipitate including the cations, calcium and lanthanum, of the ternary calcium lanthanum sulfide compound provides a powder which has a reduced particle size and wherein the precipitate reaction products of calcium carbonate and lanthanum are homogenously mixed. With this carbonate powder, the step of converting such powder into the sulfide material occurs over a relatively short period of time. With the sintering step in a sulfur rich environment, sintering occurs without decomposition of the sulfide material. Also, within the sulfur rich environment any unconverted precipitate reaction products from the previous processing steps are converted into the sulfide material. With compression of the material under an elevated pressure and temperature, the density of the sulfide material is increased to at least 99.5% of the theoretical density of such sulfide material without substantially affecting the relatively small grain size of the sulfide material, thus providing a material having an improved hardness.

BRIEF DESCRIPTION OF THE DRAWINGS

The aforementioned aspects and other features of the invention are explained in the following description taken in connection with the accompanying drawings, in which.

DESCRIPTION OF THE PREFERRED EMBODIMENTS

Figure 1:
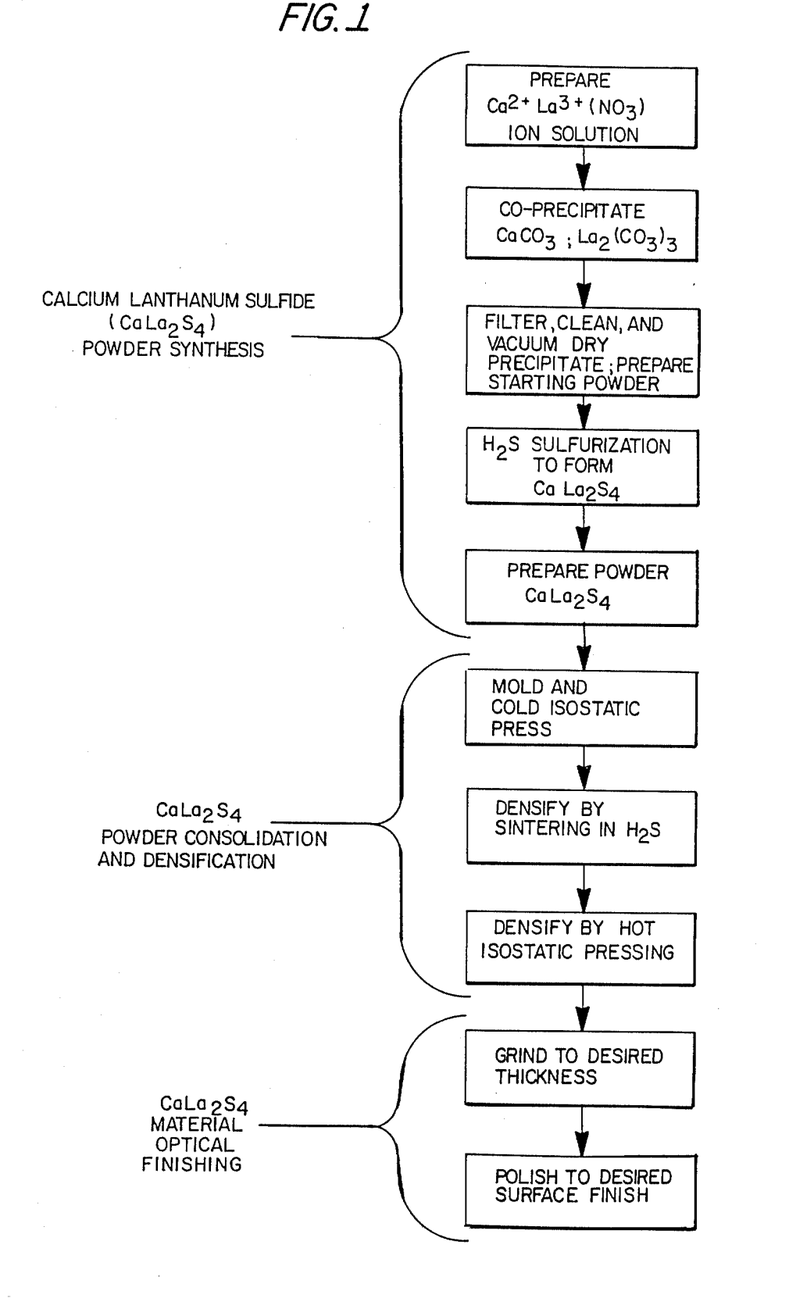
FIG. 1 is a process flow diagram showing steps in the method of fabricating a ternary sulfide calcium lanthanum sulfide, optical material.

A process for fabricating an optically transmittant body will initially be described in conjunction with the process flow diagram of FIG. 1.

Referring now to FIG. 1, an ionic solution of metal cations and nitrate anions is prepared to provide a source of such metal cations. The metal cations selected are calcium and lanthanum although other cations such as strontium and neodymium or a single cation such as lanthanum may be used. Here, 12.5 grams of hydrous, crystalline calcium nitrate ($Ca(NO_3)_2 \cdot 4H_2O$) and 47.3 grams of hydrous, crystalline lanthanum nitrate ($La(NO_3)_3 \cdot 6H_2O$) are disolved in 175 ml of distilled water ($H_2O$) to form an ionic solution wherein the calcium cations and lanthanum cations disassociate from the nitrate anions. (A hydrous crystal is a crystal within which water molecules are combined with molecules of the crystal). The above-mentioned hydrate characteristics of the calcium nitrate (.$4H_2O$) and the lanthanum nitrate (.$6H_2O$) are approximate characteristics and such materials are distributed by VWR Scientific Inc., Boston, Mass. Catalog Nos. 1395-5 and P354, respectively. Calcium nitrate and lanthanum nitrate sources of calcium and lanthanum ions ($Ca^{+2}$, $La^{+3}$) are selected because of their relatively high solubility in water. The above-described ionic solution provides an adequate source of calcium and lanthanum cations used to fabricate optically transmittant ternary calcium lanthanum sulfide material in a manner to be described. The cation solution of calcium and lanthanum is prepared by first dissolving the crystals of calcium nitrate and the crystals of lanthanum nitrate in water at a temperature of approximately 22° C. The temperature of the ionic solution is then gradually raised to approximately 40° C. During this interval, the solution of calcium and lanthanum nitrates is constantly stirred to intermix the calcium ions, lanthanum ions and nitrate ions in solution.

A precipitating agent solution is here prepared by mixing 47.1 grams of ammonium carbonate with 125 ml of water. The ammonium carbonate is believed to be an anhydrous crystal, that is, a crystal without water molecules combined with the crystal molecules. The ammonium carbonate here is distributed by Thiokol/Ventron Division, Andover Street, Danvers, Mass. Catalog No. 303352. The precipitating solution is prepared by adding the ammonium carbonate to the water which is at a temperature of approximately 22° C. The temperature of the ammonium carbonate solution is then gradually elevated to a temperature of approximately 40° C., while the ammonium carbonate is constantly stirred to provide a source of ammonium ions and carbonate ions in the precipitating agent solution. The ammonium carbonate precipitating agent solution is then gradually added to the calcium lanthanum nitrate ionic solution. As the ammonium carbonate solution is added to the constantly stirred ionic solution of calcium and lanthanum nitrates, two ionic reactions take place wherein calcium carbonate precipitate and lanthanum carbonate precipitate are concurrently formed as precipitate reaction products in accordance with ionic reactions 1 and 2:

$$Ca^{-2} + CO_3^{+2} \rightarrow CaCO_3 \qquad \text{(Reaction 1)}$$

$$2La^{-3} + 3CO_3^{+2} \rightarrow La_2(CO_3)_3 \qquad \text{(Reaction 2)}$$

After complete addition of the ammonium carbonate solution, the nitrate solution and the precipitates are mixed in the mixing vat for approximately ten minutes to insure complete precipitation of calcium carbonate and lanthanum carbonate from the nitrate solution and to provide a homogeneous mixture of calcium carbonate precipitate and lanthanum carbonate precipitate. The intimately mixed precipitates, (i.e. the co-precipitate) of calcium carbonate and lanthanum carbonate, facilitate conversion of such calcium and lanthanum sources into the calcium lanthanum sulfide material during subsequent sulfurization in a manner to be described.

The co-precipitate of calcium carbonate and lanthanum carbonate is then filtered from the nitrate solution, cleaned by using distilled water, and is then dried in a vacuum oven at approximately 110° C. for twenty-four to seventy-two hours. A highly agglomerated homogeneous, intimately mixed mass of calcium carbonate and lanthanum carbonate is provided after drying of the precipitate. It is to be noted, however, that the calcium carbonate and lanthanum carbonate are believed to be in hydrous form, having a heretofore undetermined amount of water molecules which are in combination with the calcium carbonate and lanthanum carbonate molecules.

As previously mentioned, the calcium carbonate and the lanthanum carbonate are intimately mixed and uniformly distributed throughout the agglomerated mass. The calcium carbonate and lanthanum carbonate agglomerated mass is broken up into a starting powder, as shown in FIG. 2B, by conventional techniques such as using a mortar and pestle prior to further processing of such material.

Figure 2A:
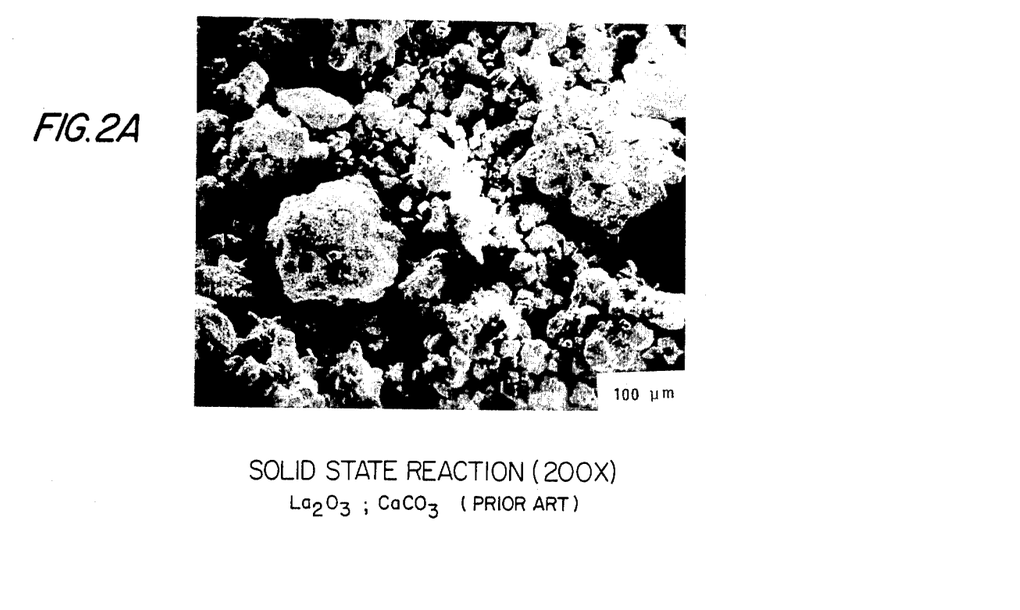
FIG. 2A is a scanning electron microscope (SEM) photomicrograph at a magnification of 200× of intermixed calcium carbonate and lanthanum oxide powders provided in accordance with a prior art technique detailing particle size of such powders.
Figure 2B:
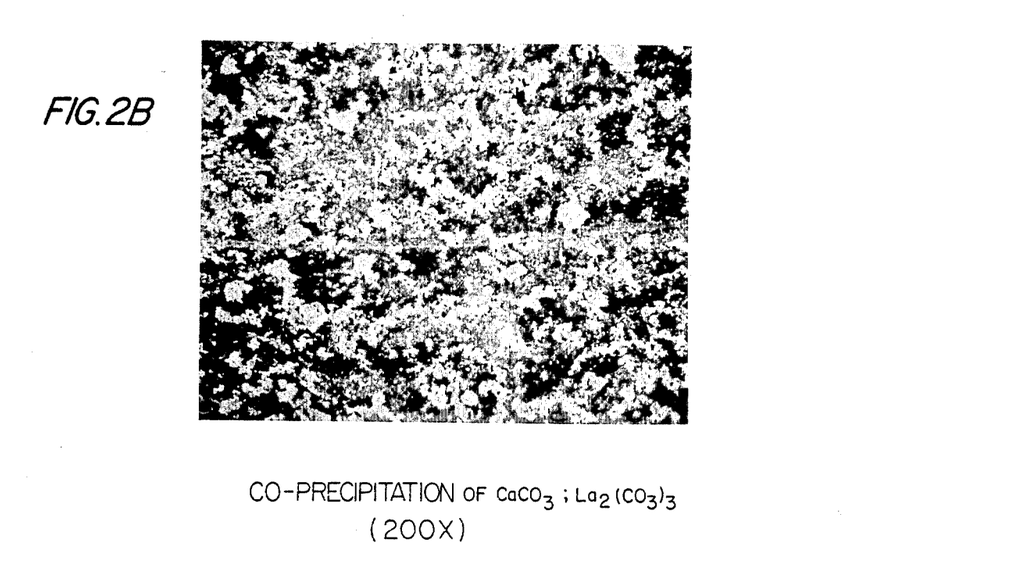
FIG. 2B is an SEM photomicrograph at a magnification of 200× of co-precipitated homogenously mixed calcium carbonate and lanthanum carbonate powders provided in accordance with FIG. 1 showing detailed particle size of such powders.

As shown in FIG. 2A, a scanning electron microscope (SEM) photomicrograph reveals the detailed microstructure of a mixture of calcium carbonate and lanthanum oxide powder processed by conventional solid state reaction. The small cubic-like structures are believed to be calcium carbonate particles whereas the lanthanum oxide particles are believed to be particles which range in size from the dust-size particles to the large agglomerated chunks. Thus, as previously described, a large variation in size between calcium carbonate and lanthanum oxide powders as well as a large variation in size between the lanthanum oxide particles in general, as understood, hinders formation of the calcium lanthanum sulfide powder. To improve such formation, intermediate steps such as jet milling of the powder to reduce the particle size of the agglomerated lanthanum oxide powders in particular is generally required. As previously mentioned, such a step generally, as understood, introduces unwanted impurities into the powders.

Concurrently forming precipitates of calcium carbonate and lanthanum carbonate provides a fine-grained, homogeneously mixed starting powder which is more readily converted into the calcium lanthanum sulfide during subsequent sulfurization. As shown in FIG. 2B, a SEM photomicrograph of the calcium carbonate and lanthanum carbonate starting powder reveals a microstructure having particles which are substantially uniform and small in size. Absent are the large agglomerated particles of lanthanum carbonate, as shown in FIG. 2A. Thus, due to the intimately, homogeneously mixed starting powder and the reduced particle size of the calcium carbonate and lanthanum carbonate starting powder, formation of the calcium lanthanum sulfide powder is more readily accomplished during sulfurization, in a manner to be described, without the need for intermediate processing steps such as jet milling.

The starting powder is then sulfurized to convert such starting powder into the calcium lanthanum sulfide. This is accomplished as follows: The intimately mixed calcium carbonate and lanthanum carbonate starting powder is disposed in an alumina boat, and the alumina boat is then placed in an alumina reaction tube furnace. The interior of the tube is purged of atmospheric gases by directing a continuous flow of helium or another inert gas into the tube. The flow rate for the helium gas is typically 20 SCCM (standard cubic centimeters per minute). The furnace is then raised to a predetermined, elevated temperature, typically in the range of 900° C. to 1100° C. A preferred elevated temperature of 1000° C. is here used. At the preferred elevated temperature of 1000° C. and with the continuous flow of helium gas, a predetermined continuous flow rate of hydrogen sulfide gas (H₂S) is directed over the calcium carbonate and lanthanum carbonate starting powder. Here the flow rate for the hydrogen sulfide gas for 35.1 grams of calcium carbonate and lanthanum carbonate starting powder is 80 SCCM. A continuous flow of hydrogen sulfide is provided for here approximately 20 hours at 1000° C. In response to such flow of hydrogen sulfide at the elevated temperature, a reaction takes place by diffusion of sulfur into the carbonate powder in accordance with reaction 3 to provide the calcium lanthanum sulfide:

(Reaction 3)

The calcium lanthanum sulfide material is also a well-agglomerated mass which is broken up into smaller sized particles to increase the surface area of the material. The technique here used to break up the material is to grind the material with a mortar and pestle with a predetermined amount of methanol having previously been added to the material. The material and the methanol are intermixed for one to two minutes. A 400 mesh sieve is then used to filter out particles having a dimension greater than 37 microns. The filtered calcium lanthanum sulfide material is then dried out by evaporating the methanol to provide a powder of calcium lanthanum sulfide.

Having formed the calcium lanthanum sulfide powder, the powder is then processed into the optically transmittant body. The processing for shaping the body is here as follows: The powder is first molded into the shape of body by placing the powder in a mold and pressing the powder into the desired shape. The molded powder is further processed by cold isostatically pressing the molded powder to consolidate the powder and provide calcium lanthanum sulfide material with an actual density of approximately 60% of the theoretical density of such material. As is known in the art, cold isostatic pressing involves isostatic compression of material by a fluid introduced into a vessel at an elevated pressure and constant temperature. A fluid, typically a liquid, surrounds the material previously sealed under a vacuum in a rubber enclosure, and exerts a pressure of here 25,000 psi substantially uniformly in all directions on the material to consolidate the material. After consolidation of the material, the material is sintered.

During sintering, the calcium lanthanum sulfide material is placed on a setter plate, here comprised of boron nitride. The setter plate is then disposed in a graphite resistance furnace. The internal atmosphere of the graphite resistance furnace is then placed under a vacuum and backfilled with an inert gas such as helium to remove atmospheric gases. The temperature of such furnace is elevated to a temperature in the range of 1000° C. to 1400° C. with 1150° C. being the preferred temperature, while maintaining atmospheric pressure and a continuous helium flow in the furnace. Sintering takes place at the elevated temperature of 1150° C. for approximately sixteen hours by passing the continuous flow of helium having a flow rate of 50 SCCM and a reactive gas, hydrogen sulfide, having a flow rate of here 15 SCCM across the material disposed on the boron nitride plate. The presence of the hydrogen sulfide gas during sintering aids in preventing decomposition of the calcium lanthanum sulfide material at the elevated temperature by preventing sulfur from leaving the calcium lanthanum sulfide material. The sulfur rich environment might also aid in the conversion of any unconverted calcium carbonate or lanthanum carbonate material or any material deficient in sulfur which still might be present in the consolidated material. After sintering, the calcium lanthanum sulfide material has an actual density in the range of approximately 91 to 95% of its theoretical density.

Figure 3A:
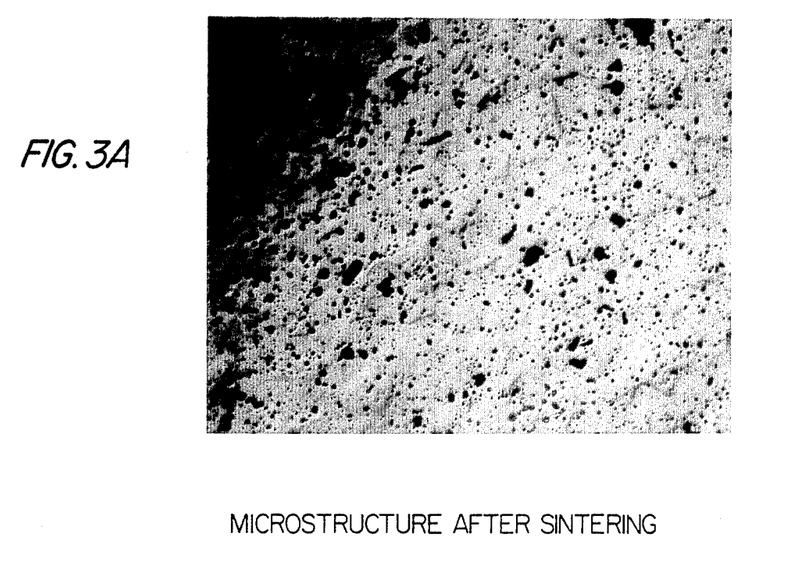
FIG. 3A is a photomicrograph from an optical microscope at a magnification of 187× of a portion of a body of the calcium lanthanum sulfide material fabricated in accordance with FIG. 1 detailing microstructure of the body after sintering.

As shown in FIG. 3A, the microstructure of the surface of the body is comprised of isolated closed pores and small grains of such material.

The material after sintering is wrapped in a platinum foil and is then processed by a technique commonly referred to as hot isostatic pressing. Hot isostatic pressing involves the compression of a material at an elevated temperature and pressure in a nonreactive gas environment such as nitrogen or one of the noble gases, such as argon. Argon is here introduced into the vessel at room temperature (22° C.) to an elevated pressure of approximately 8000 psi. The temperature of the vessel is then elevated to a temperature in the range of 900° C. to 1100° C., here 990° C. raising the pressure of the argon in response thereto to a pressure in the range of 25,000 psi to 29,000 psi. Such pressure is exerted on the body substantially uniformly in all directions. The body is maintained at these conditions for approximately three hours. At the completion of this process, a body having a density of at least 99.5% of the theoretical density of such material is obtained.

Figure 3B:
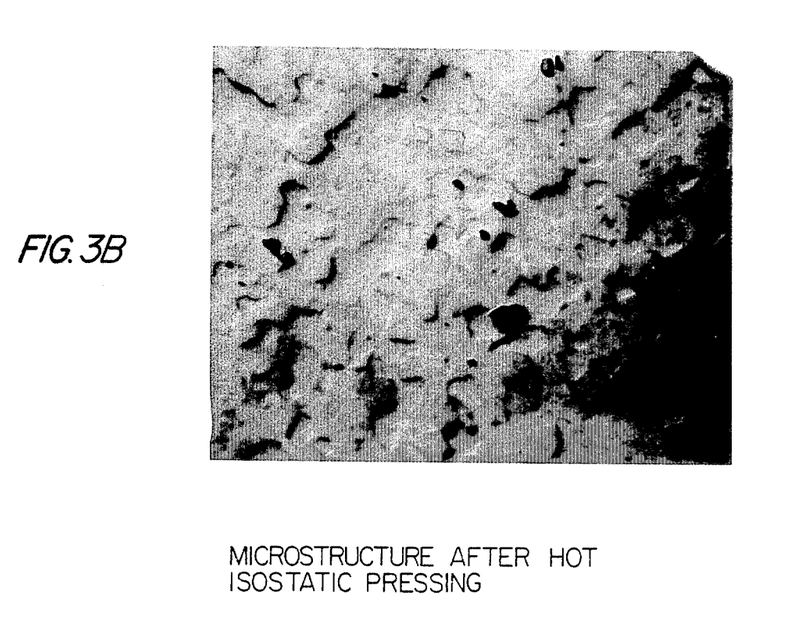
FIG. 3B is a photomicrograph from an optical microscope at a magnification of 187× of a portion of the body of calcium lanthanum sulfide shown in FIG. 3A fabricated in accordance with FIG. 1 detailing microstructure of the body after hot isostatic pressing.

As shown in FIG. 3B, the microstructure of the surface of the body after hot isostatic pressing provides material having substantially no porosity without changing the grain size of the material provided during the sintering step. The fabricated body is then ground and polished to predetermined specifications of thickness and surface quality using conventional techniques.

With the above-described process, several advantages in providing bodies comprising ternary sulfides is provided.

Again, as shown in FIG. 2A, a (SEM) photomicrograph reveals the detailed microstructure of a calcium carbonate (small cubes) and lanthanum oxide (large agglomerated particles and background particles) mixture for solid state reaction conversion to calcium lanthanum sulfide. As previously described in the Background of the Invention section, this technique involves the steps of mixing pure calcium carbonate and pure lanthanum oxide particles such as that shown in FIG. 2A and then sulfurizing the mixture to provide calcium lanthanum sulfide. It is to be noted that calcium carbonate is in the form of relatively small cubes whereas the lanthanum oxide particles vary in size from very fine powder to the very large agglomerated masses. Thus, with this approach, there is believed to be an unequal reaction rate of the prepared powders with sulfur, and as a result, complete conversion of calcium and lanthanum to calcium lanthanum sulfide is hindered. Further, material made with this method generally includes the binary sulfide calcium sulfide. The presence of calcium sulfide in the calcium lanthanum sulfide is believed responsible, in part, for degraded optical properties of the calcium lanthanum sulfide material manufactured in accordance with such method and in other prior art techniques.

Figure 4A:
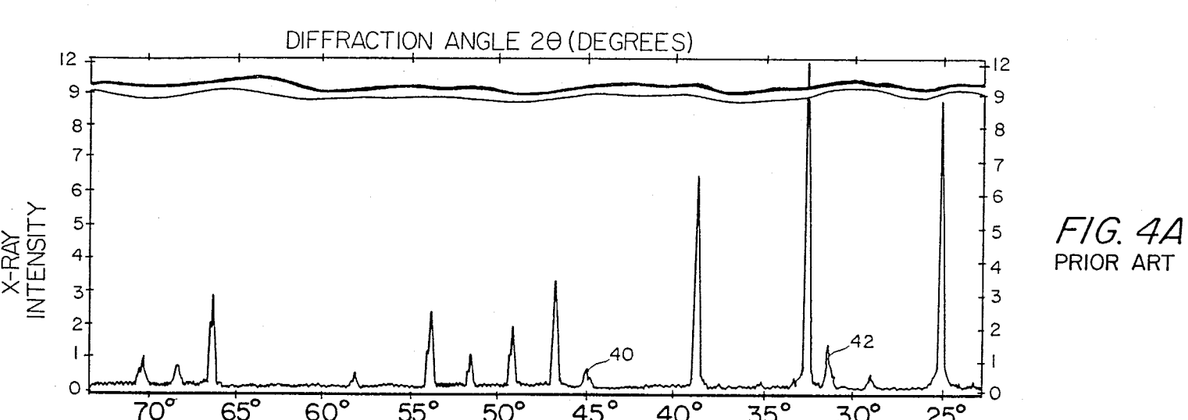
FIG. 4A is a graph of X-ray intensity versus diffraction angle ($2\theta$) for an x-ray diffraction analysis of a typical sample of calcium lanthanum sulfide material fabricated in accordance with the prior art technique of FIG. 2A.

As shown in FIG. 4A, an x-ray diffraction pattern of a calcium lanthanum sulfide material made from the conventional solid state reaction of calcium carbonate and lanthanum oxide such as that described above in conjunction with FIG. 2A by passing hydrogen sulfide gas over the sample for 100 hours at 1060° C. depicts peaks 40 and 42 which occur at a diffraction angles of $2\theta=31.5°$ and $2\theta=45°$ indicating the presence of calcium sulfide. The presence of calcium sulfide in the calcium lanthanum sulfide is undesirable, as understood, because of the crystallographic dissimilarities of calcium sulfide to the calcium lanthanum sulfide. The presence of calcium sulfide is believed to provide a reduction in the desired optical transmittance properties of the calcium lanthanum sulfide material. Thus, the presence of the calcium sulfide in calcium lanthanum sulfide material is highly undesirable.

Again, as shown in FIG. 2B, an SEM photomicrograph shows the mixed calcium carbonate and lanthanum carbonate starting powder provided as a result of concurrently precipitating calcium carbonate and lanthanum carbonate from the nitrate solution in accordance as described above. As shown, the coprecipitated calcium carbonate and lanthanum carbonate particles are intimately mixed, providing a homogenous starting powder, and are of relatively small and substantially uniform particle size. Sulfurization of such starting powder to provide the calcium lanthanum sulfide is significantly easier and provides substantially complete conversion of the calcium carbonate and lanthanum carbonate to the calcium lanthanum sulfide. Further, since the particle sizes are relatively small thereby having increased particle surface area, the amount of time required for such conversion is substantially decreased from the above-mentioned solid state reaction method.

Figure 4B:
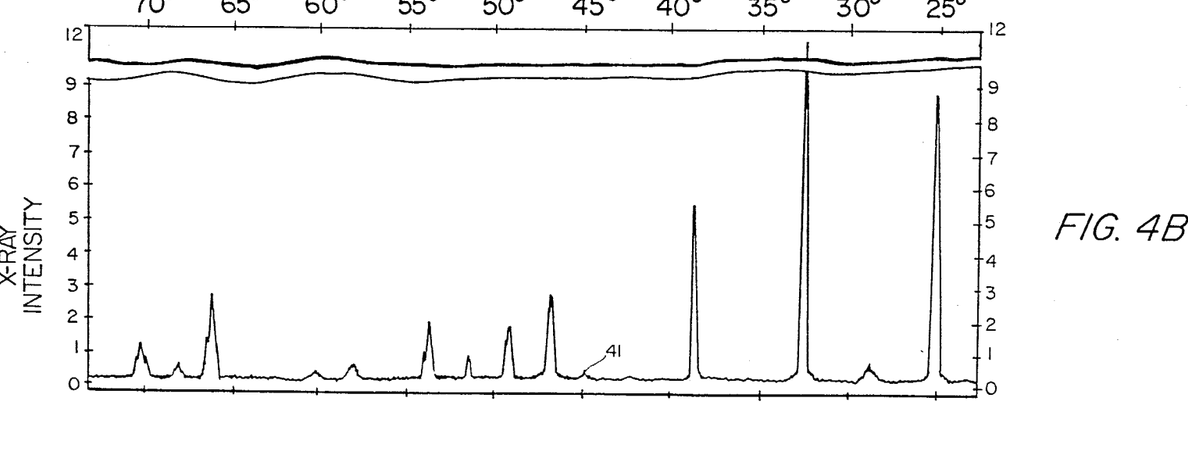
FIG. 4B is a graph of X-ray intensity versus diffraction angle ($2\theta$) for an x-ray diffraction analysis of a sample of calcium lanthanum sulfide material fabricated in accordance with FIG. 1 after sulfurization.

Referring now to FIG. 4B, an x-ray diffraction pattern of a sample of calcium lanthanum sulfide material made from the co-precipitation (i.e. concurrent precipitation) of calcium carbonate and lanthanum carbonate and sulfurized for twenty hours in a helium/hydrogen sulfide atmosphere at an elevated temperature of 1000° C. is shown. It is noted that the peaks 40, 42 (FIG. 5A) generally associated with the calcium sulfide, as depicted in FIG. 4A, are substantially eliminated from the X-ray diffraction analysis of FIG. 4B. Thus, it is believed that the calcium sulfide has been substantially reduced. However, as can be seen in FIG. 4B, at $2\theta=45°$ there appears to be a very small peak 41 present indicating that there still may be a small amount of calcium sulfide contained in the calcium lanthanum sulfide. Thus, the calcium lanthanum sulfide material fabricated from the co-precipitation of calcium carbonate and lanthanum carbonate is substantially absent of calcium sulfide and thus is believed to be a substantially phase-pure composition.

Figure 5:
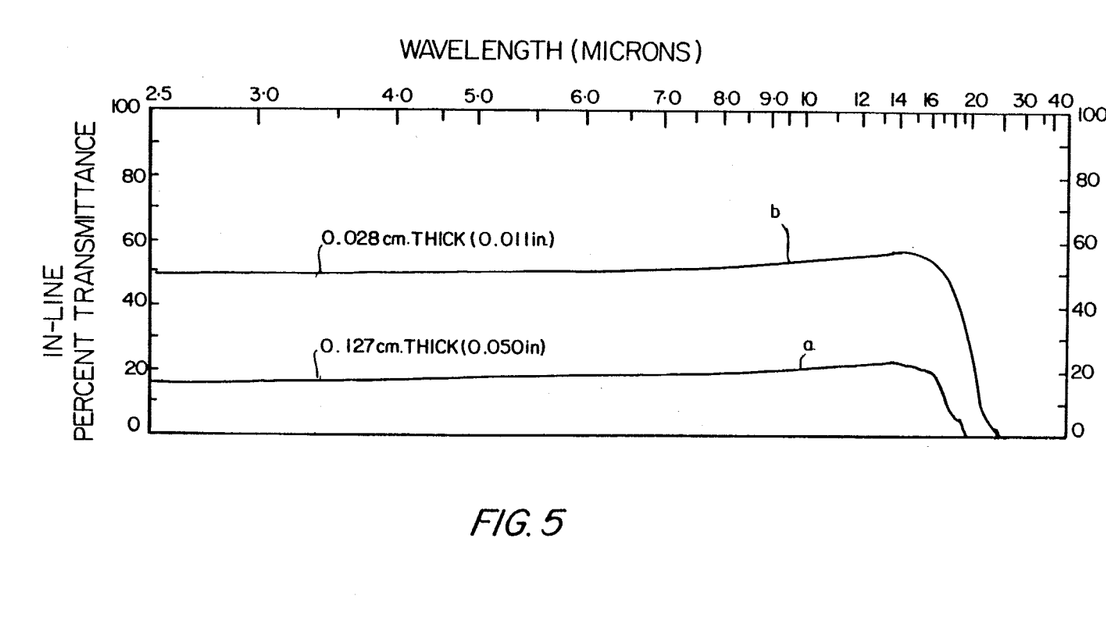
FIG. 5 is a graph of percent transmittance versus wavelength of two samples having different thicknesses of the calcium lanthanum sulfide material of FIG. 4B.

Referring now to FIG. 5, a graph of in-line infrared percent transmittance for the calcium lanthanum sulfide material fabricated in accordance with FIG. 1 is shown for a sample (a) having a thickness of 0.011 inches (curve a) and a sample (b) having a thickness of 0.049 inches (curve b).

TABLE 1

| Wavelength (micron) | % Transmittance $T_a$ Sample A $t_a$ = 0.011 inches | % Transmittance $T_b$ Sample B $t_b$ = 0.049 inches | $\alpha$ (cm$^{-1}$) |
|---|---|---|---|
| 4 | 50 | 17 | 11 |

TABLE 1-continued

| Wavelength (micron) | % Transmittance $T_a$ Sample A $t_a$ = 0.011 inches | % Transmittance $T_b$ Sample B $t_b$ = 0.049 inches | $\alpha$ (cm$^{-1}$) |
|---|---|---|---|
| 6 | 51 | 18 | 11 |
| 8 | 52 | 20 | 10 |
| 10 | 54 | 21 | 10 |
| 12 | 56 | 23 | 9 |
| 14 | 56 | 23 | 9 |
| 16 | 56 | 21 | 10 |
| 18 | 46 | 6 | 52 |

From the values of percent transmittance from each curve a, b, a characteristic of the material which indicates the absorption of the material for electromagnetic radiation in the range of 4 microns to 18 microns is obtained from the equation $\alpha = [-\ln (T_b/T_a)]/(t_b - t_a)$, where $\alpha$ is a quantity referred to as the "coefficient of absorption," $T_a$, $T_b$ are the percent transmittance of samples a, b, respectively, and $t_a$, $t_b$ are the thicknesses of samples a, b. For material fabricated in accordance with FIG. 1, $\alpha$ is in the range of 9 cm$^{-1}$ to 11 cm$^{-1}$ to electromagnetic radiation having a wavelength in the range of 4 microns to 16 microns.

Figure 6:
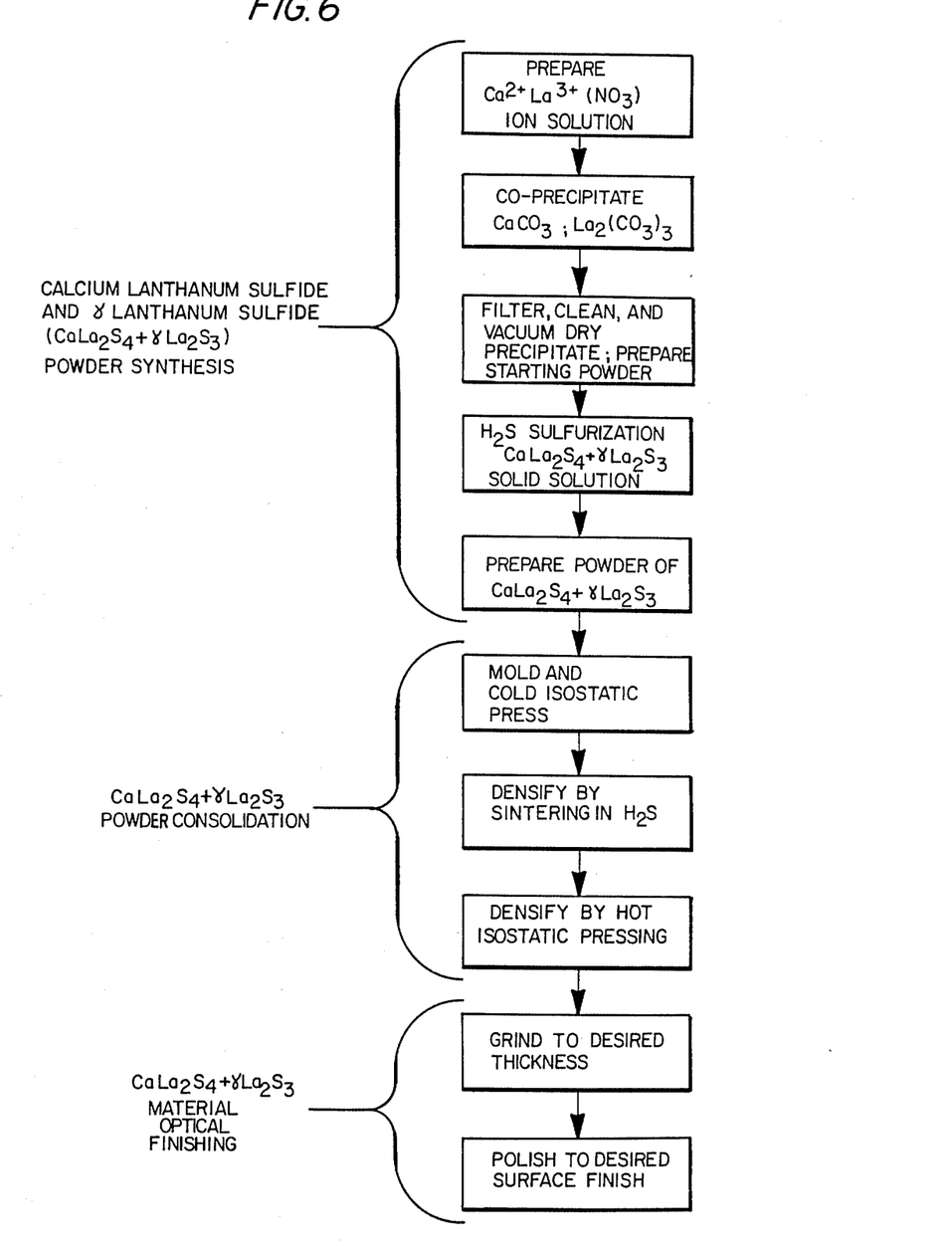
FIG. 6 is a process flow diagram showing steps in the method of fabricating a ternary sulfide and binary sulfide solid solution, such as, a solid solution of calcium lanthanum sulfide and $\gamma$ lanthanum sulfide, optical material.

Referring now to FIG. 6, a process is described for fabricating an optically transmittant body of ternary sulfide having an in-line percent transmittance greater than that produced by the process described in connection with FIG. 1. Here again an ionic solution of metal cations and nitrate anions is prepared to provide a source of such metal cations. The metal cations selected are calcium and lanthanum although other cations such as strontium and neodymium may be used. Here, 22.1 grams of hydrous, crystalline calcium nitrate (Ca(NO$_3$)$_2$.4H$_2$O) and 108.3 grams of hydrous, crystalline lanthanum nitrate (La(NO$_3$)$_3$.6H$_2$O) are dissolved into 300 ml of distilled water (H$_2$O) to form an ionic solution wherein the calcium and lanthanum cations disassociate from the nitrate anions. The above-mentioned hydrate characteristics of the calcium nitrate (.4H$_2$O) and the lanthanum nitrate (.6H$_2$O) are approximate characteristics and such materials are distributed by VWR Scientific Inc., Boston, Massachusetts, as previously mentioned. Calcium nitrate and lanthanum nitrate sources of calcium and lanthanum ions (Ca$^{+2}$, La$^{+3}$) are again selected because of their relatively high solubility in water. The above-described ionic solution was chosen to provide an excess amount of lanthanum ions in relation to calcium ions. A ratio of at least 4.1 grams of lanthanum nitrate to 1 gram of calcium nitrate is used, with a ratio of approximately 5 grams of lanthanum nitrate to 1 gram of calcium nitrate here being the preferred ratio. Alternatively, more than 2.0 moles of lanthanum per 1.0 moles of calcium is used to provide the excess lanthanum in the solution. The cation solution of calcium and lanthanum is prepared by first dissolving the crystals of calcium nitrate and the crystals of lanthanum nitrate in water at a temperature of approximately 22° C. The temperature of the solution is then gradually raised to approximately 40° C. During this interval, the solution of calcium and lanthanum nitrates is constantly stirred to intermix the calcium ions, lanthanum ions and nitrate ions in solution.

A precipitating agent solution is here prepared by mixing 81.2 grams of ammonium carbonate with 214 ml of water. The ammonium carbonate here used is distributed by Thiokol/Ventron Division, Danvers, Mass., as previously described. The precipitating solution is prepared by adding the ammonium carbonate to the water which is at a temperature of approximately 22° C. The temperature of the ammonium carbonate solution is then gradually elevated to a temperature of approximately 40° C., while the ammonium carbonate is constantly stirred to provide a source of ammonium ions and carbonate ions in the precipitating agent solution. The ammonium carbonate precipitating agent solution is then gradually added to the calcium lanthanum nitrate ionic solution. As the ammonium carbonate solution is added to the constantly stirred ionic solution of calcium and lanthanum nitrates, two ionic reactions take place wherein calcium carbonate precipitate and lanthanum carbonate precipitate are concurrently formed in accordance with ionic reactions 1 and 2 as previously mentioned.

After complete addition of the ammonium carbonate solution, the nitrate solution and the precipitates are mixed in the mixing vat for approximately ten minutes to insure complete precipitation of calcium carbonate and lanthanum carbonate from the nitrate solution and to provide a homogenous mixture of calcium carbonate precipitate and lanthanum carbonate precipitate. The intimately mixed precipitates (i.e. the co-precipitate) of calcium carbonate and lanthanum carbonate facilitate conversion of such calcium and lanthanum sources into the calcium lanthanum sulfide material during subsequent sulfurization in a manner to be described.

The co-precipitate of calcium carbonate and lanthanum carbonate is then filtered from the nitrate solution, cleaned by distilled water, and is then dried in a vacuum oven at approximately 110° C. for twenty-four to seventy-two hours. A highly agglomerated homogenous, intimately mixed mass of calcium carbonate and lanthanum carbonate is provided after drying of the precipitate, as previously described in conjunction with FIG. 1. The calcium carbonate and the lanthanum carbonate are intimately mixed and uniformly distributed throughout the agglomerated mass. The calcium carbonate and lanthanum carbonate agglomerated mass is broken up into a starting powder, as previously shown in FIG. 2B, by conventional techniques such as using a mortar and pestle prior to further processing of such material. The calcium carbonate and lanthanum carbonate starting powders have a microstructure having particles which are substantially uniform and small in size, as previously described.

The starting powder is then sulfurized to convert such starting powder into a solid solution of calcium lanthanum sulfide and $\gamma$ phase lanthanum sulfide. This is accomplished as follows: The intimately mixed calcium carbonate and lanthanum carbonate starting powder is disposed in an alumina boat and the alumina boat is then placed in an alumina reaction tube furnace as previously described in conjunction with FIG. 1. The interior of the tube is purged of atmospheric gases by directing a continuous flow of helium or another inert gas into the tube. The flow rate for the helium gas is typically 20 SCCM (standard cubic centimeters per minute). The furnace is then raised to a predetermined, elevated temperature of at least 900° C. Here a preferred elevated temperature of 1000° C. is used. At the preferred elevated temperature of 1000° C. and with the continuous flow of helium gas, a predetermined continuous flow rate of hydrogen sulfide gas (H$_2$S) is directed over the calcium carbonate and lanthanum carbonate starting powder. Here the flow rate for the hydrogen sulfide gas for 394 grams of calcium carbonate and lanthanum carbonate starting powder is 680 SCCM. A continuous flow of hydrogen sulfide is provided for approximately 20 hours at 1000° C. In response to such flow of hydrogen sulfide at the elevated temperature, a reaction takes place by diffusion of sulfur into the carbonate powder in accordance with unbalanced reaction 4 to provide 284 grams of calcium lanthanum sulfide and the binary sulfide, lanthanum sulfide La$_2$S$_3$:

$$2La_2(CO_3)_3 + CaCO_3 + 7H_2S \rightarrow CaLa_2S_4 + La_2S_3 + 7H_2O + 7CO_2 \quad \text{(Reaction 4)}$$

Here an excess or predetermined amount of lanthanum nitrate in relation to the amount of calcium nitrate is provided in the nitrate solution, with more than 2.0 moles of lanthanum being provided for each mole of calcium. With this composition, and after subsequent sulfurization at a temperature of at least 900° C. as described above, calcium lanthanum sulfide and the binary sulfide, lanthanum sulfide, are believed formed. The phase or structure type of lanthanum sulfide believed formed is gamma ($\gamma$) phase lanthanum sulfide. Formation of $\gamma$ phase lanthanum sulfide is preferable to the binary sulfide calcium sulfide or other phases of lanthanum sulfide such as $\beta$ lanthanum sulfide because $\gamma$ phase lanthanum sulfide has a crystallographic structure substantially the same as that of calcium lanthanum sulfide whereas the binary sulfides $\beta$ lanthanum sulfide and calcium sulfide have crystallographic structures which are substantially different than the crystallographic structure of calcium lanthanum sulfide. Gamma phase lanthanum sulfide is thus believed to form a solid solution with the calcium lanthanum sulfide. Because the calcium lanthanum sulfide and the $\gamma$ lanthanum sulfide have substantially the same crystallographic structure after densification, an optically transmittant body having a high degree of transmittance is provided, as will be described hereinafter.

It is to be noted that after sulfurization, two types of material are believed present in the product produced from the sulfurization. The first material, being substantially all of the sulfurization product, is believed to be the solid solution of calcium lanthanum sulfide and $\gamma$ lanthanum sulfide having a slightly yellowish appearance when observed. The second material present in the sulfurization product is believed to be partially sulfurized material, which is deficient in sulfur, or unsulfurized calcium carbonate and lanthanum carbonate. The second material has a whitish appearance and is substantially completely converted to calcium lanthanum sulfide or lanthanum sulfide during a subsequent sintering in a hydrogen sulfide atmosphere.

Figure 7:
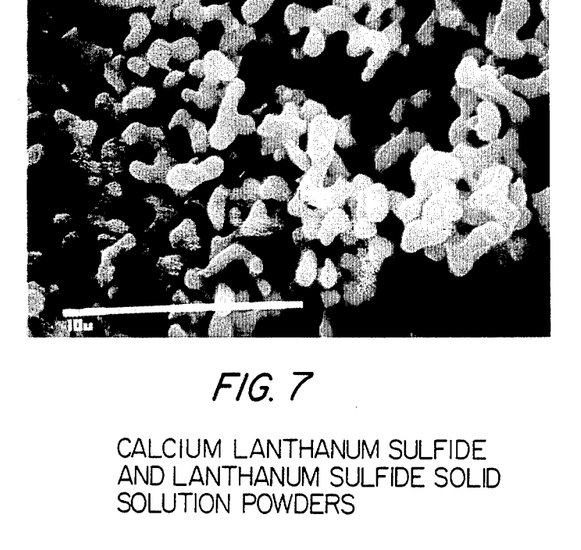
FIG. 7 is an SEM photomicrograph at a magnification of 5000× of calcium lanthanum sulfide and $\gamma$ lanthanum sulfide powder fabricated in accordance with FIG. 6.

The solid solution of calcium lanthanum sulfide and $\gamma$ lanthanum sulfide is also a well-agglomerated mass which is broken up into smaller sized particles to increase the surface area of the material, as previously described, by grinding the material with a mortar and pestle with a predetermined amount of methanol having previously been added to the material. A 400 mesh sieve is then used to filter out particles having a dimension greater than 37 microns. The filtered calcium lanthanum sulfide and $\gamma$ lanthanum sulfide material is then dried out by evaporating the methanol providing a powder of the solid solution of calcium lanthanum sulfide and $\gamma$ lanthanum sulfide as shown in FIG. 7.

Having formed the calcium lanthanum sulfide and $\gamma$ lanthanum sulfide solid solution powder, the powder is then processed into the optically transmittant body. The processing for forming the body is substantially the same as previously described including the steps of molding, cold pressing, sintering and hot isostatically pressing.

During sintering, however, the temperature of such furnace is elevated to approximately 1150° C. while maintaining an atmospheric pressure and a continuous helium flow in the furnace. Sintering takes place at the elevated temperature of 1150° C. for approximately two hours by passing a continuous flow of helium having a flow rate of 50 SCCM and hydrogen sulfide having a flow rate of 15 SCCM, as a reactive gas, across the sample disposed on the boron nitride setter plate. The presence of the hydrogen sulfide gas during sintering aids in preventing decomposition of the calcium lanthanum sulfide and γ lanthanum sulfide material at the elevated temperature by preventing sulfur from leaving the material. The sulfur rich environment also aids in the conversion of any unconverted calcium carbonate or lanthanum carbonate material or any material deficient in sulfur provided from the sulfurization step which might be present in the consolidated material, as mentioned above. After sintering, the calcium lanthanum sulfide and γ lanthanum sulfide material has achieved an actual density in the range of approximately 91 to 95% of its theoretical density.

Figure 8A:
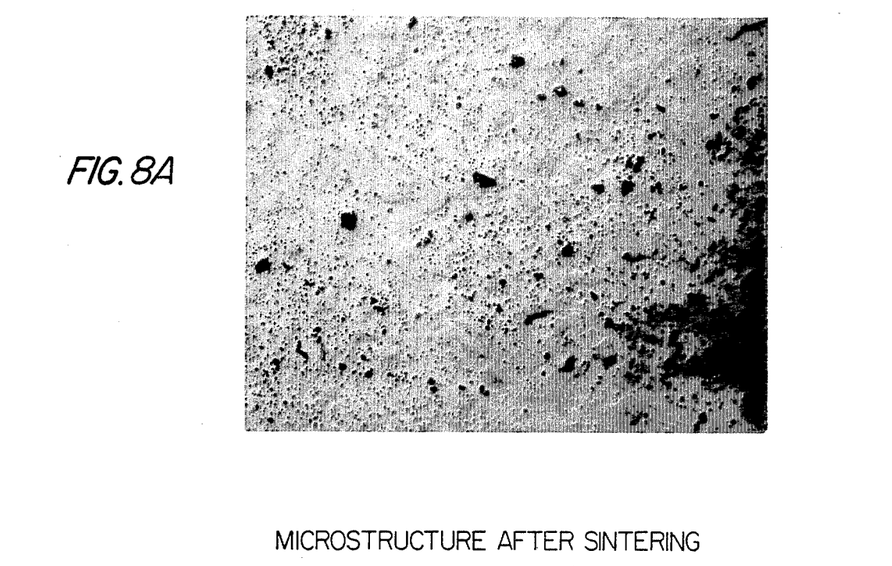
FIG. 8A is a photomicrograph from an optical microscope at a magnification of 187× of a portion of a body of the calcium lanthanum sulfide and $\gamma$ phase lanthanum sulfide material fabricated in accordance with FIG. 6 detailing the microstructure of the body after sintering.

As shown in FIG. 8A, the microstructure of the surface of the body is comprised of isolated closed pores and small grains of such material.

The material, after sintering, is then processed by a technique commonly referred to as hot isostatic pressing, as previously described. The body is hot isostatically pressed at a temperature of 990° C. and a pressure of 29,000 psi for approximately three hours. At the completion of this process, a body having a density of at least 99.5% of the theoretical density of such material is obtained.

Figure 8B:
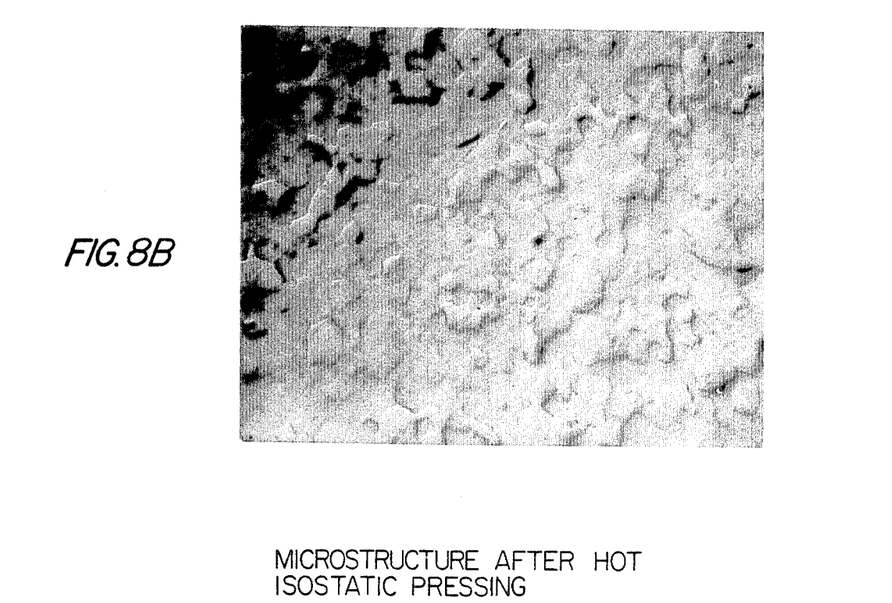
FIG. 8B is a photomicrograph from an optical microscope at a magnification of 187× of a portion of the body of FIG. 4A detailing the microstructure of the body after hot isostatic pressing.

As shown in FIG. 8B, the microstructure of the surface of the body after hot isostatic pressing provides material having substantially no porosity without substantially changing the grain size of the material provided during the sintering step. The fabricated body is then ground and polished to predetermined specifications of thickness and surface quality using conventional techniques.

With the above-described process, several advantages in providing bodies comprising a ternary sulfide in solid solution with a binary sulfide are provided.

Again, as shown in FIG. 2B, the concurrently precipitated calcium carbonate and lanthanum carbonate particles are intimately mixed, providing a homogenous starting powder and are of relatively small and substantially uniform particle size. Sulfurization of such starting powder to provide the solid solution of calcium lanthanum sulfide and γ lanthanum sulfide is significantly easier and provides substantially complete conversion of the calcium carbonate and lanthanum carbonate to the calcium lanthanum sulfide and γ lanthanum sulfide, as previously described.

By providing an excess amount of lanthanum, all of the calcium present combines with lanthanum to provide additional calcium lanthanum sulfide, and there is substantially no calcium remaining to form the undesirable calcium sulfide. Thus, adding an excess amount of lanthanum prevents formation of calcium sulfide in the calcium lanthanum sulfide material. Further, any excess lanthanum is so processed to provide γ phase lanthanum sulfide which has substantially the same crystal structures as, and is in solid solution with, calcium lanthanum sulfide.

Figure 9:
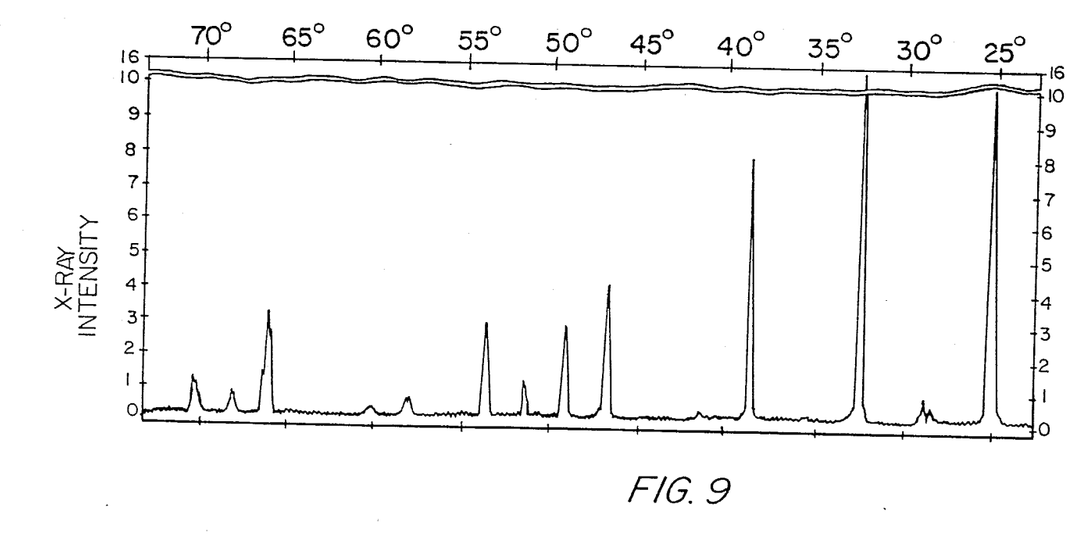
FIG. 9 is a graph of X-ray intensity versus diffraction angle for an x-ray diffraction analysis of the solid solution material of FIG. 7.

As shown in FIG. 9, an x-ray diffraction pattern of a sample of calcium lanthanum sulfide and γ phase lanthanum sulfide material made from the co-precipitation of calcium carbonate and excess lanthanum carbonate as described above and processed by the above-described sulfurization step for twenty hours in a helium/hydrogen sulfide atmosphere at an elevated temperature of 1000° C. does not exhibit the peaks 40, 42 (FIG. 5A) generally associated with the calcium sulfide as depicted in FIG. 5A.

As also noted, the addition of excess lanthanum processed in accordance with the techniques described above provides lanthanum sulfide which has a similar crystallographic structure as calcium lanthanum sulfide. An X-ray diffraction analysis of the material thus does not exhibit any peaks which are uncharacteristic of calcium lanthanum sulfide. That is because the peaks of the phase lanthanum sulfide, believed present, are masked by the peaks provided by the calcium lanthanum sulfide because of the substantially identical crystal structure. Thus, the calcium lanthanum sulfide and lanthanum sulfide fabricated by providing an excess amount of lanthanum in relation to calcium and sulfurized at a temperature in excess of 900° C. have the same crystallographic structure. Thus, the solid solution of calcium lanthanum sulfide and lanthanum sulfide is a substantially phase-pure composition, being substantially depleted of β phase lanthanum sulfide and calcium sulfide.

Figure 10:
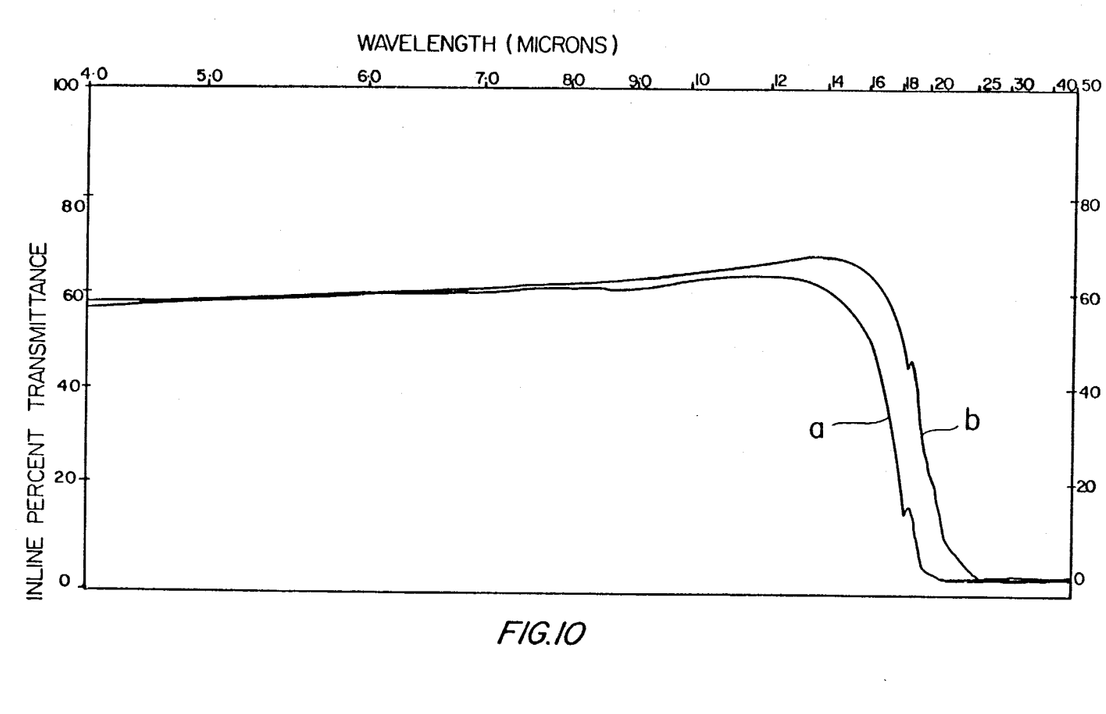
FIG. 10 is a graph of percent transmittance versus wavelength of two samples having different thicknesses of the material of FIG. 8B.

Referring now to FIG. 10, a graph of in-line infrared percent transmittance for the solid solution of calcium lanthanum sulfide and γ lanthanum sulfide material fabricated in accordance with the alternate embodiment of the present invention is shown for a sample (a) having a thickness of 15 mil (0.015 inch) (curve a) and a sample (b) having a thickness of 48 mil (0.048 inch) (curve b). It is to be noted that the optical transmittance (at 50% transmittance) for both samples is at least 16 microns.

TABLE 2

| Wavelength (Microns) | % Transmittance ($T_1$) Sample A $t_1 = 0.015$ inches | % Transmittance ($T_2$) Sample B $t_2 = 0.048$ inches | ($cm^{-1}$) |
|---|---|---|---|
| 4 | 57 | 57 | <0.1 |
| 6 | 60 | 60 | <0.1 |
| 8 | 62 | 61 | 0.194 |
| 10 | 65 | 63 | 0.373 |
| 12 | 67 | 63 | 0.735 |
| 14 | 67 | 61 | 1.120 |
| 16 | 65 | 51 | 2.895 |
| 18 | 50 | 20 | 10.934 |

From the values of percent transmittance from each curve a,b, a characteristic of the material which indicates the degree of absorption of such material of electromagnetic radiation in the range of 4 to 18 microns is obtained from the equation $\alpha = [-\ln(T_b/T_a)]/(t_b - t_a)$ where $\alpha$ is a quantity referred to as the "coefficient of absorption," $T_a$, $T_b$ are the percent transmittance of samples a, b, respectively, and $t_a$, $t_b$ are thicknesses of samples a, b, respectively. As shown in Table 2, for the material fabricated in accordance with the present invention, $\alpha$ is in the range of $<0.1$ $cm^{-1}$ to $2.89$ $cm^{-1}$ for electromagnetic radiation having a wavelength in the range of 4 microns to 16 microns. Thus, the relatively low coefficient of absorption of such material indicates that the percent transmittance of such material for thicker samples will be relatively high.

Having described preferred embodiments of the invention, it will now be apparent to one of skill in the art that other embodiments incorporating its concept may be used. For example, other ratios of calcium nitrate and lanthanum nitrate may be used as well as other sources of calcium and lanthanum cations. Further, other cations such as strontium and neodymium may also be used. It is felt, therefore, that this invention should not be limited to the disclosed embodiment, but rather should be limited only by the spirit and scope of the appended claims.

What is claimed is:

1. A method for making a dense optically transmissive body comprising a ternary sulfide having a pair of cation types comprising the steps of:
   coprecipitating a fine grained homogeneous powder including the pair of cation types of the ternary sulfide;
   reacting the coprecipitated powder with a source of sulfide anions to convert said precipitate into the ternary sulfide; and
   forming the ternary sulfide into the densified, optically transmissive body.

2. The method as recited in claim 1 wherein the ternary sulfide formed is calcium lanthanum sulfide and the step of coprecipitating the fine grained powder includes the steps of:
   providing an aqueous solution including the nitrates of calcium and lanthanum; and
   introducing a precipitating agent into the aqueous ionic solution to form said coprecipitated powder.

3. The method as recited in claim 2 wherein the precipitating agent includes the carbonate ion to form a fine grained homogeneous powder of calcium carbonate and lanthanum carbonate.

4. The method as recited in claim 3 wherein the homogeneous mixture of calcium carbonate and lanthanum carbonate is formed in small agglomerated particles which are broken up to provide the fine grained homogeneous powder.

5. The method as recited in claim 1 wherein the reacting step includes the step of directing hydrogen sulfide gas over the deagglomerated coprecipitated powder to convert the powder into calcium lanthanum sulfide.

6. The method as recited in claim 5 wherein the step of forming the body further comprises the steps of:
   consolidating the calcium lanthanum sulfide into the body;
   sintering the calcium lanthanum sulfide in an environment of sulfur at an elevated temperature in the range of 900° C. to 1100° C.; and
   compressing the sintered calcium lanthanum sulfide at an elevated pressure which is substantially uniform in all directions and at an elevated temperature in the range of 900° C. to 1100° C.

7. The method as recited in claim 6 wherein the compressing step takes place at a pressure in the range of 20,000 psi to 30,000 psi.

8. The method as recited in claim 5 wherein the reacting step takes place over the temperature range of 900° C. to 1100° C.

* * * * *